United States Patent [19]
Bauer

[11] 4,264,222
[45] Apr. 28, 1981

[54] METHOD OF MAKING THE HUB OF A PRINTING WHEEL FOR IMPACT PRINTERS AND PRINT WHEEL OBTAINED THEREBY

[76] Inventor: Eric Bauer, Rue Maujobia 113, 2000 Neuchatel, Canton of Neuchatel, Switzerland

[21] Appl. No.: 51,027

[22] Filed: Jun. 22, 1979

Related U.S. Application Data

[63] Continuation-in-part of Ser. No. 882,772, Mar. 2, 1978, abandoned.

[30] Foreign Application Priority Data

Aug. 23, 1977 [CH] Switzerland ............... 010300/77

[51] Int. Cl.³ ............................ B29D 3/00; B41J 9/00
[52] U.S. Cl. ............................... 400/174; 264/161; 264/267; 264/273; 264/275; 400/144.2
[58] Field of Search ............ 264/259, 267, 271, 273, 264/275, 245, 246, 138, 161; 400/144.2, 144.3, 144.4, 174, 175

[56] References Cited
U.S. PATENT DOCUMENTS

| | | | |
|---|---|---|---|
| 2,277,543 | 3/1942 | Downs | 264/246 |
| 2,288,187 | 6/1942 | Gits et al. | 264/247 |
| 3,302,242 | 2/1967 | Morin | 264/247 |
| 3,861,646 | 1/1975 | Douglas | 264/267 |
| 3,935,937 | 2/1976 | Tramposch | 101/368 |
| 4,037,706 | 7/1977 | Sohl et al. | 400/144.2 |
| 4,128,346 | 12/1978 | Ragland | 400/144.2 |

*Primary Examiner*—W. E. Hoag
*Attorney, Agent, or Firm*—Silverman, Cass & Singer, Ltd.

[57] ABSTRACT

A method of manufacturing the molded hub of a print wheel of the type having a central axial passage of precise diameter and a plurality of elastically deformable, concentrically arranged character carrying radial arms. A metal ring carrying radial passageways is centered in the mold cavity used for forming the hub, etc., and a plastics composition is injected into the mold cavity only through the center of the ring and by way of the radial passageways whereby the metal ring becomes a unitary permanent part of the hub and defines the central axial passage. After the molding, the molded structure is released from the mold and the remainent central plastic plug easily is sheared from the ring, as by punching, for example. Remainent plastic material left within the radial passageways functions supplementary to maintain the stability and concentricity of the ring and hub assembly.

7 Claims, 12 Drawing Figures

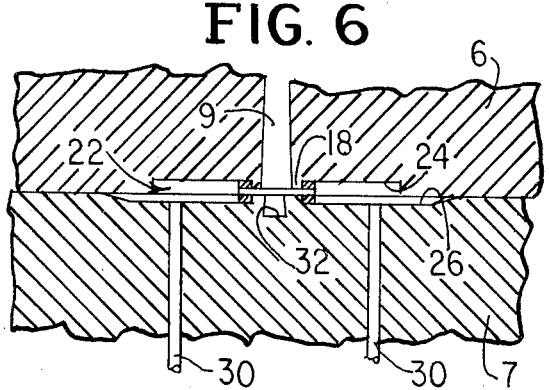
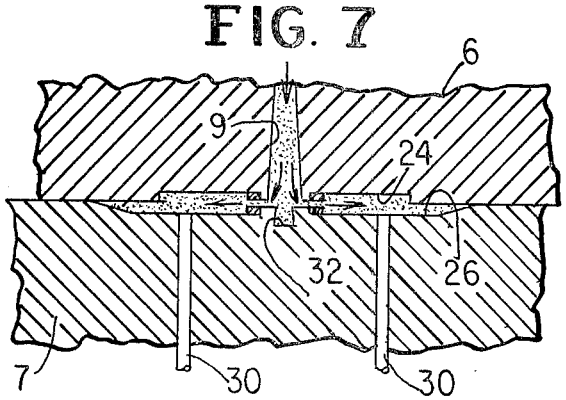
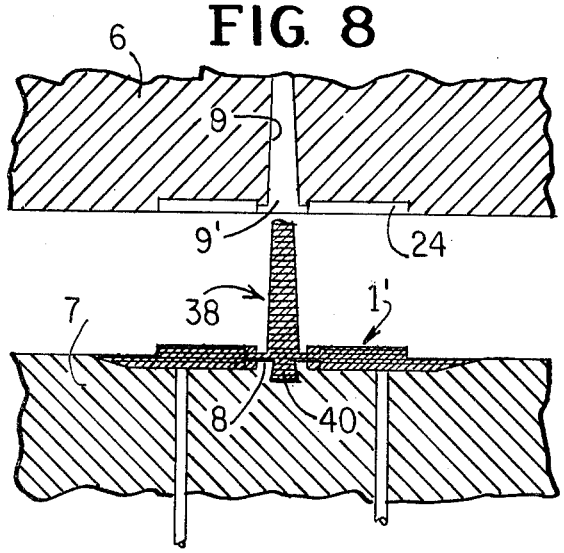
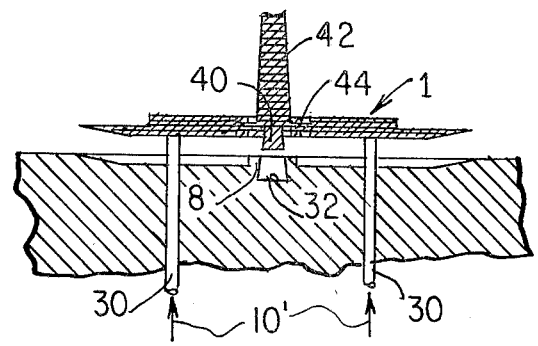
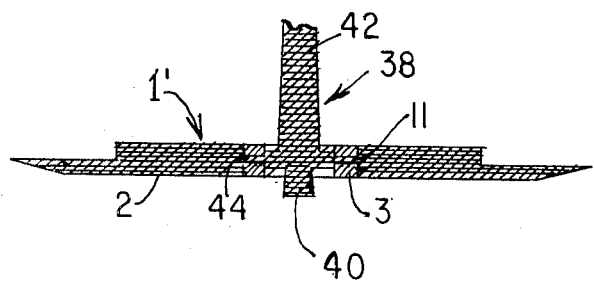
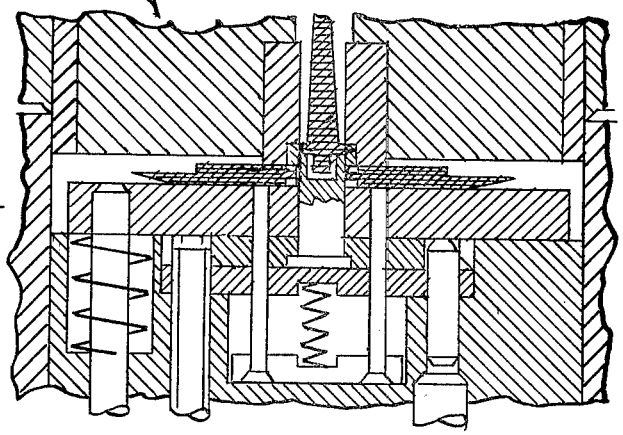

METHOD OF MAKING THE HUB OF A PRINTING WHEEL FOR IMPACT PRINTERS AND PRINT WHEEL OBTAINED THEREBY

REFERENCE TO RELATED APPLICATIONS

This application is a continuation-in-part application of my application Ser. No. 882,772 filed Mar. 2, 1978, now abandoned for PRINT WHEEL FOR IMPACT PRINTER AND PRINT WHEEL OBTAINED BY CARRYING OUT THIS METHOD.

BACKGROUND OF THE INVENTION

This invention relates generally to the manufacture of print wheels for impact printers of the type which include elastically deformable, concentrically arranged radial arms having type font characters at their free ends and a plastic molded hub having a central passage.

In particular, the invention provides a method of molding the aforementioned hub to provide a precise diameter central passage without requiring further machining of the molded part subsequent formation.

Print wheels of the type concerned are required to be perfectly plane, to have their radial character carrying arms concentric and coplanar, at their free ends and have a central mounting passage of precise diameter with maintenance of precise tolerance specifications. Preferably, at least the hub portion of the print wheel is molded radially outwardly from the center thereof to assure at least initial concentricity and parallel coplanar character disposition. In practice, difficulties are encountered when molding in a radially outward direction in attaining and maintaining the desired concentricity and the precision tolerances demanded of the central passage.

In addition to requiring precision machining of the molded article subsequent to molding and adding thereby to the cost of the article; there is inherent shrinkage, deformation, etc., so that even if the articles are machined precisely once formed, the resultant articles may well change and the precision obtained in the resultant articles may be changed. Even relatively the tolerances required to provide a useful, effective product are difficult to obtain and maintain on a practical and/or economic basis. Minor variations are significantly effective to sharply limit the life of the print wheel and its utility.

Reliance upon the machining operation subsequent to formation of the hub effectively force the concentricity and diameter tolerances of the central passage to be dependent upon the precision of the machining operation. There are too many variable to justify such reliance.

In addition, machining of the completed hub to achieve concentricity and meet the precise diameter specification requires breaking or cutting of the surface of skin of the plastic molded article which is formed during molding. Ordinarily, such plastic "skin" affords resistance to the effects of humidity. Porosity of the finished product is increased with the resultant increased deleterious effect upon the absorbancy of environmentally present materials including some fluids, gases, solvents, etc. Thus, even if one could initially achieve desired precision and obtain concentricalty by machining, distortion due to the resulting increase in porosity of the article molded such as shrinkage, absorption of fluids, etc. would materially reduce the chances of maintaining the precision and concentrically within desired fine tolerance over the desired useful life of the article.

It would be desirable to form the hub, etc., whereby the precision of the central passage of the hub is independent totally of the molding conditions.

Further, opposite axial surfaces of the hub should be parallel to assure the proper disposition of the print wheel and of the characters carried thereby during use.

The printing wheel ordinarily is mounted on one of its axial faces. If the opposite axial sides of the hub of the print wheel were not perfectly planar and perpendicular to the axis of the central passage, the printing wheel properly could not be mounted. Repair of such defects would involve machining of the opposite surfaces to dress the lateral faces. Again, the process involved is expensive. As with any machining involving cutting, one would break the surface film or skin of the plastic material which is formed at the time of molding. This would impart increased porosity to the material. The useful life of the article materially would be reduced. The deleterious effect of humidity, etc., would be a material factor in reducing its useful life, causing unacceptable distortion and change exceeding tolerance specifications.

SUMMARY OF THE INVENTION

The invention provides a method of manufacturing a molded hub for a print wheel for impact printers, the wheel including a plurality of elastically deformable, concentrically arranged radial arms capable of having type font characters applied to the free ends for disposition thereof coplanar one relative the others. The hub is required to have a central passage mounting hole of precise dimension. Preferably, the hub has planar parallel opposite faces perpendicular to the central axis of the hub.

The method according to the invention consists of first seating a metal ring centrally within the mold cavity for the hub, the metal ring being provided with plural radial passageways. The ring is seated in a mold and a hardenable plastic composition is injected forcefully into the mold cavity only by way of the center of the ring and through the radial passageways. Subsequently, the molded hub, including its flash or residual plastic plug formed in the central passage, is released unitarily from the mold. The plug is sheared from the ring, as by punching, leaving the inner wall of the ring clean of plastic to define the precise central passage of the completed hub, eliminating any machining or further finishing steps to obtain a precisely dimensioned central passage. Any residual plastic material within the radial passageways is retained therein and functions supplementary to retain the ring and hub in firm permanent assembly with maintenance of desired concentricity and dimension over the life of the resulting article.

BRIEF DESCRIPTION OF THE DRAWING

FIG. 6 is a fragmentary detail of the mold of FIG. 4 illustrating a further step in the molding method according to the invention;

FIG. 7 is a fragmentary detail of the mold of FIG. 4 illustrating an additional step in the molding method according to the invention;

FIG. 8 is a fragmentay detail of the mold of FIG. 4 illustrating separation of the mold parts immediately subsequent to completion of the molding process;

FIG. 9 is a fragmentary detail of the mold of FIG. 4 illustrating the manner by which the molded article is released from the mold immediately subsequent to completion of the molding process;

FIG. 10 is a fragmentary sectional detail of the completed molded article in the condition when released from the mold;

FIG. 12 is a detail of the punch apparatus of FIG. 11 illustrating the separation of said remainent plastic plug from the center of the molded article of FIG. 10.

DESCRIPTION OF THE PREFERRED EMBODIMENT

Figure 1:
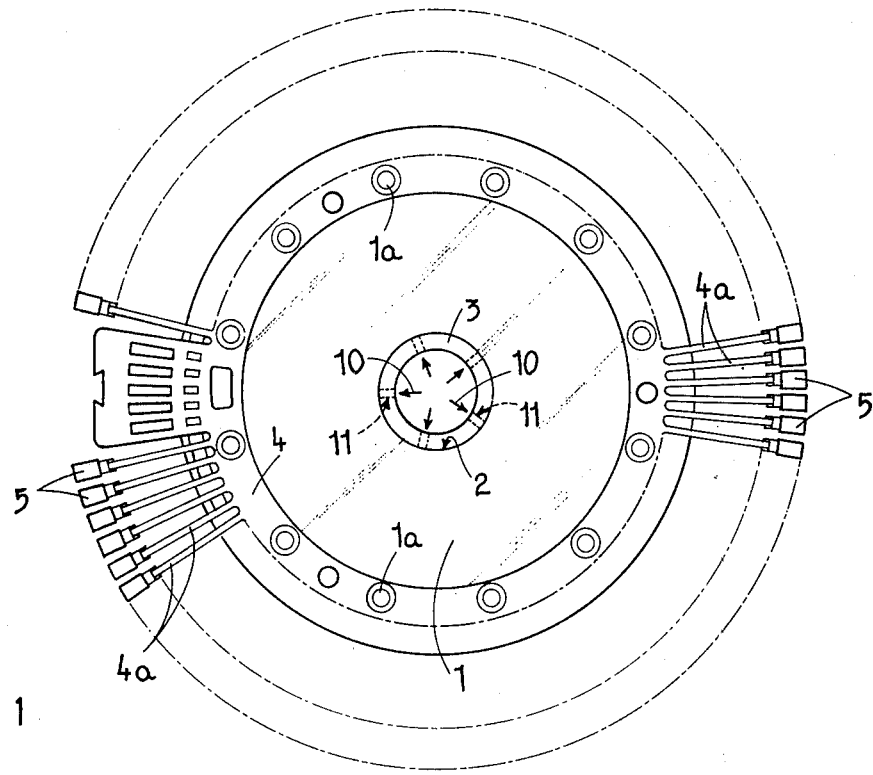
FIG. 1 is a plan view of a print wheel employing a hub manufactured in accordance with the method of this invention.
Figure 2:
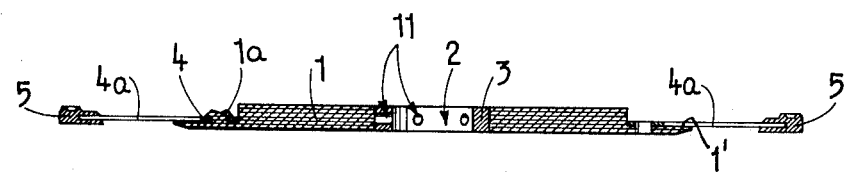
FIG. 2 is a sectional view taken along lines II—II of FIG. 1 and in the direction indicated.
Figure 3:
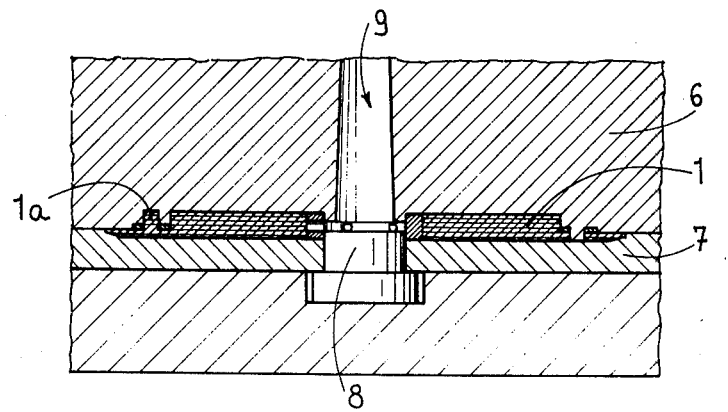
FIG. 3 is a diagrammatic sectional view of the hub of FIG. 1 illustrated disposed within a typical molding apparatus for practicing the method according to the invention.
Figure 4:
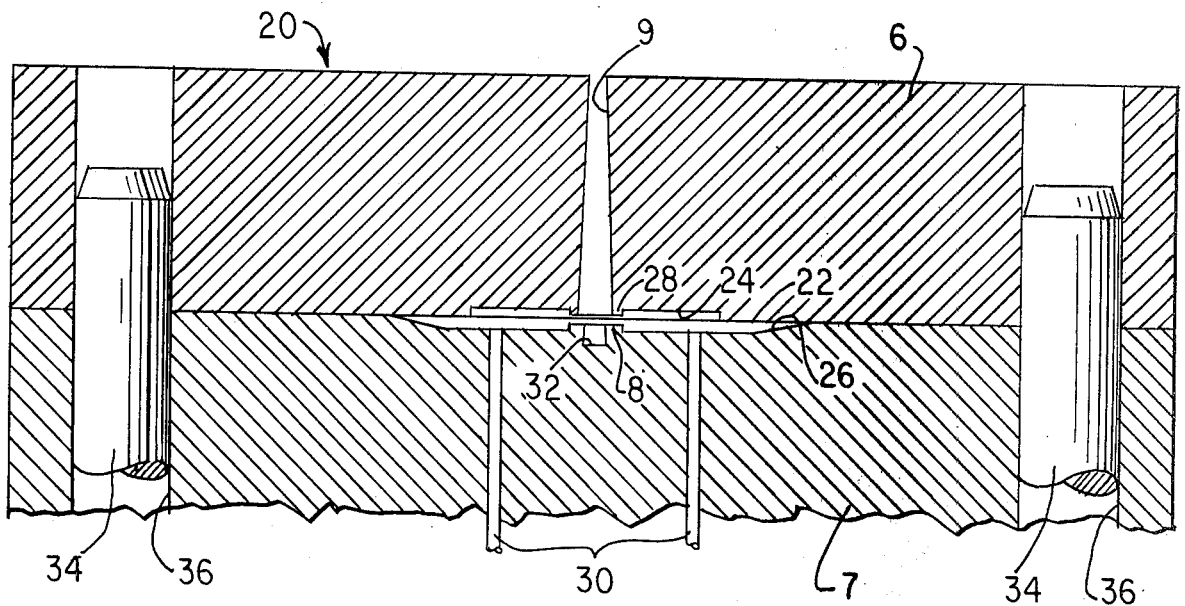
FIG. 4 is an enlarged diagrammatic sectional view of a mold illustrated prior to initiation of the molding procedure.
Figure 5:
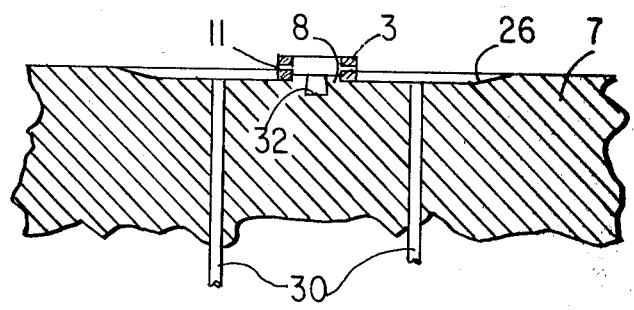
FIG. 5 is a detail of one part of the mold of FIG. 4 illustrating a step in the molding method according to the invention.
Figure 11:
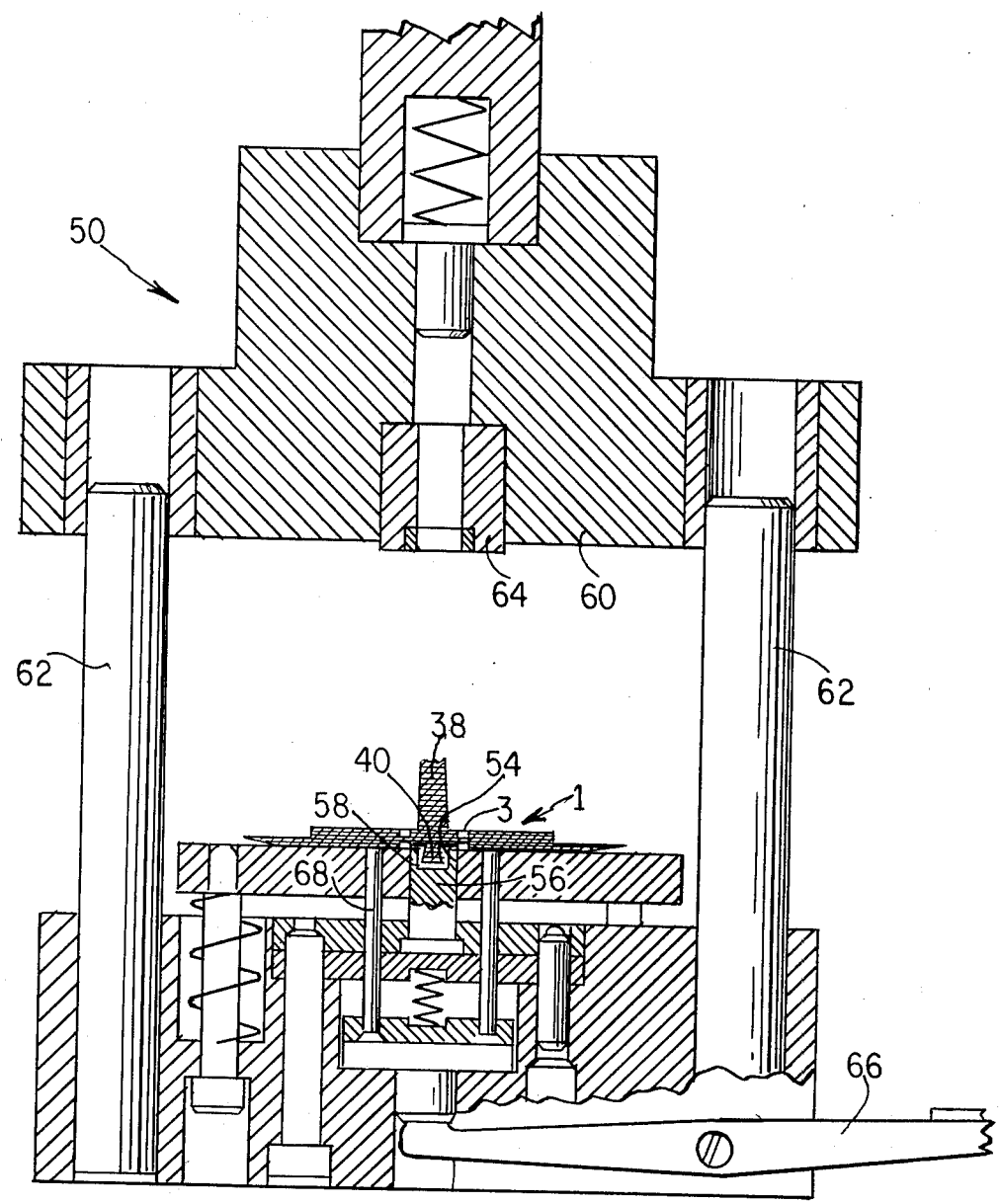
FIG. 11 is a framentary diagrammatic representation, in section, illustrating a punch apparatus employed to shear any remainent plastic from the central passage core of the molded article of FIG. 10.

The print wheel represented in FIG. 1 comprises a hub 1 made of a plastics composition and is provided with a central hole or passage 2 defined by metal ring 3. Metal ring 3 is provided with radial passageways including plastic material unitary with the hub 1. A metal crown 4 is carried by hub 1 on rim 1' thereof as shown in FIGS. 1 and 2 and has deformable radial arms 4a. Characters, e.g. type font, are provided at the free ends of radial arms 4a and can be applied thereto by overmolding processes, adhesively secured thereto or otherwise applied. The crown 4 may be assembled to the hub 1 by means of protrusions or pins 1a formed on the hub, which pass through suitable holes provided in the crown 4. The ends of pins 1a are riveted as by hot riveting process, for example, to retain the assembly of crown 4 on hub 1.

When applied it is essential that the radial arms 4a be concentrically arranged about the axis of the hub and that the characters at the free ends of arms 4a occupy a single common plane and that such plane be perpendicular to the axis of a common print wheel when that wheel is operably installed in a printing machine. Ordinarily, the print wheel is installed by seating one axial face on a supporting member of the printing machine in which it is employed.

It is essential that the central passage 2 be provided with a precise diametric dimension, which remains unchanged during the useful life of the print wheel. The concentricity of the hub must be maintained over the useful life of the resulting print wheel. With these two required specifications, and also, requirement to provide parallel, planar opposite faces, the dimensions of the central hole of the hub 1 advantageously are independent of the molding conditions, according to the herein invention.

The diameter of the central passage 2 of the hub 1 is defined by the precise inner diameter of the metal ring 3. Machining the completed molded hub is avoided in contrast to prior art processes for manufacture of hubs of this type. The hub 1 is molded by providing a two element cavity mold apparatus and injecting a conventional plastics composition, centrally of the mold, directing same only radially outward thereof. As in the past, a residual plug of plastics material is formed and is retained and must be separated from the completed hub.

Heretobefore, the plugs were separated by precise machining. Maintenance of very fine tolerance was required and was frequently difficult as well as expensive to attain. The available machining processes involving severance as by cutting tools, are unsatisfactory, leaving burrs, unevenness and/or loss of concentricity.

In addition, the aforementioned machining or finishing processes break the "skin" of the molded article which is formed during molding. Breakage of such "skin" increases the porosity of the material and reduces the useful life of the resultant print wheel by increasing the deleterious effects of humidity, other fluids, etc. upon the dimensional stability thereof, resulting in significant and unacceptable changes, however slight, in concentricity.

Machining and other finishing processes which involve cutting of the article often are described in the art as "working" steps and hence it may be said that the hub according to the invention is completed without further "working" steps subsequent to completion of the molded article.

Shearing or severance as used hereinafter, according to the method of the invention, is performed while the article is still warm. Since a metal core ring is made an integral part of the completed hub during molding thereof, the residual plastics plug which is sheared closely subsequent to molding, has little if any tendency to cling to the metallic inner surface of the ring 3 and hence much reduces shear resistance relative thereto.

According to the method of the invention as described hereinafter, it will be seen that the metal ring 3 has been provided with radial passageways 11, and that the injection of the plastics material composition into the mold cavity occurs only through the central passage 2, i.e., the interior of the ring 3, and through the radial passageways 11 provided in the ring 3.

Additionally, it will be seen that the area defined by the central passage within the mold axially preferably is reduced by leaving a space only equivalent axially to the diameter or axial depth of the radial passageways 11. Accordingly, only a very thin plastics to plastics connection remains after molding between the metal ring and the residual or remainent plastics plug which must be severed. Thus, the shearing step, effected as by punching, is accomplished easily without damage to the skin of the hub.

Plastic material remains within the radial passageways of the hub 1 when said hub is completed defining radial connecting portions unitary with the completed hub portion exterior of the metal ring. These connecting portions function to increase the stability of the completed hub and to maintain premanently the orientation and assembly of the metal ring and plastic portion of the hub.

Further, as the completed molded hub cools subsequent to completion, the plastics hub inherently shrinks. Shrinkage would occur even after machining in prior art processes not employing the metal center ring since heat would be generated. Hence, even after machining, the dimensions and concentricity of the finished article would change to take same out from the tolerances which may have been obtained and which must be maintained. Distortion is likely to occur. As will be seen, applicant takes advantage of such anticipated shrinkage for good purpose.

Briefly, the hub 1 is obtained by injecting, preferably a hardenable plastics material into a somewhat conventional two-element cavity mold designated generally in the Figures by reference character 20. The construction of the mold 20 per se does not form a part of this invention, other conventional molding apparatus being capable of use in practicing the invention. This structure is described merely as an example of useful apparatus. Mold 20 comprises a pair of elements 6, 7 and a centering core 8.

In the illustrated structure, mold element 6 is movable and carries a portion 24 of hub cavity 22 while the mold element 7 is stationary and carries portion 26 of hub cavity 22, as well as the centering core 8. Injection passageway 9 carried by movable element 6, communicates with the cavity 22 by way of an outstanding annular protrusion 28 surrounding the inner discharge or feed opening 9' of passageway 9.

The centering core 8 of cavity portion 26 is coaxial with both passageway 9 and annular protrusion 28 when the elements 6,7 are brought together during the injection molding operation. The height of the centering core 8 above the mold cavity floor preferably is selected to be no greater than the axial distance defined as the distance between the openings of the radial passageways 11 to the inner wall of the ring 3 and the adjacent face of said metal ring 3. Likewise, the protrusion 28 extends outward a substantially equal distance. The central mounting core 8 has an outer diameter only slightly less than the inner diameter of the ring 3 so that the ring can be seated on said centering core with the radial passageways 11 next adjacent thereto. The extent of the thickness of the connection between the residual plastic plug and the metal ring is approximately equal to the diameter or axial depth of the radial passageways 11.

The discharge opening 91 of the passageway 9 of element 6 is diametrically less than the inner diameter of the ring 3. The outer diameter of the annular protrusion 28 surrounding said opening 9' is about the same as the diameter of the mounting core 8.

The mold element 7 is provided with slidable extracting or release stems 30, the purpose of which will become apparent hereinafter. In FIG. 6, the mold elements 6 and 7 are shown illustrated closed prior to initiation of the molding process according to this invention. It should be noted also that the center mounting core 8 is provided with a counter-sunk recess 32 of conical configuration, the purpose of which also will be apparent hereinafter.

The process or method according to the invention is initiated by seating of the metal ring 3 on the center mounting core of mold element 7 after the mold 20 is opened. The mold elements 6,7 are brought together guided by guide pins 34 in suitable passageways 36. The protrusion 28 extends into the ring 3 accurately centering the ring 3 in the mold cavity 22 formed of portions 24 and 26. The plastics material, preferably a hardenable plastics composition, is injected via passageway 9 into the center of the ring 3 and forced only through the radial passageways 11, to fill the full cavity 22, as shown by arrows 10, and as well, the space or area defined between protrusion 28 and mounting core 8, including the countersunk recess 32.

Once the injection of the plastics composition has been completed and polymerization effected to a degree sufficient to define the molded product, the elements 6,7 of mold 20 are separated by raising element 6. The molded article, which includes the desired hub 1 and the residual plastic plug 38 unitary therewith remains within the cavity portion 26 of element 7, held in place by the portion 40 of plug 38 located within countersunk recess 32 and is not brought away with raising of the mold element 6. The injection passageway 9 has a tapered interior configuration to facilitate raising of the upper mold element 6 without retaining said plug portion 42 formed therein.

Once the mold elements 6,7 have been separated, the extracting stems 30 are urged upwardly, in a conventional manner and using conventional means, in the direction of the arrows 10'. The molded member 1' consisting of the hub 1 and the residual plastic plug 38 are separated from the lower element of the 7 of the mold 20. Because the recess 32 is only slightly conical, the portion 40 or tail of the plug 38 can be forced from said recess 32 while the molded member 1' is lifted upwardly by the extracting stems 30. The fact that the member 1' is still warm also facilitates removal of the molded member, including plug portion 40 from the mold. The molded member 1' as removed from the mold 20 is illustrated in FIG. 10 and comprises the molded hub 1 including the ring 3 and the plastic material 44 deposed within the radial passageways 11 defining a unitary connection with hub 1 and the plug 38. These connections each consist of the portion 42 formed within the injection passage 9, the "flash" portion remainent formed between said protrusion 28 and core 8 and including the protrusion 40 formed within the recess 32. The major portion of the flash within the hub is engaged with the metal surface of the inner wall of the ring 3 while the only plastic to plastic connection comprise the junction of the material within radial passageways 11 and the flash portion.

When the molded member is released from the mold, it is placed in a punching apparatus 50 including a spring-biased table 52 provided with a central hole 54 in which is located a punch 56. This table is mounted for downward movement while the punch 56 remains stationary. The molded member 1' is mounted centrally on the spring-biased table 52 with the portion 40 thereof engaged within a central hole 58 formed in the punch 56.

The upper portion 60 of the punching apparatus 50 is moved downwardly, guided by two columns or pins 62. The central part 64 of the upper portion 60 of the punching apparatus 50 bears on the ring 3 and pushes the table 52 downwardly. The punch 56 simultaneously pushes the plug 38 from the ring 3, shearing same therefrom. The punching apparatus 50 is provided with a control lever 66 operating reciprocable extracting stems 68 to separate the completed hub 1 from the table 52.

Once the plug 38 is sheared from the ring 3, there is a clean surface defined by the ring 3. If any burr, even of minute dimension were to remain subsequent to shearing, the shrinkage of the plastics material radially inward toward the mass of molded plastics exterior of the ring during cooling effects a radial withdrawal of such material within the radial passageways 11 and spaced inwardly of the entrances thereto.

The metal rings 3, which can be effectively dimensioned to fine tolerance, thus define a central passage 2 for the hub 1 and effectively, for the print wheel. The resulting print wheel has a much longer useful life, does not require machining subsequent to formation and holds its concentricity, shape and dimensions free from effects of humidity, other fluids, etc. It should be noted that the radially deformable arms of the print wheel carrying the font or type font characters can be made of the same plastic material as the hub 1 and simultaneously therewith. The radial passageways provided in the ring 3 according to the invention herein may comprise bores as illustrated, or may be formed as grooves in one or the other or both faces of the ring. Any suitable plastics composition may be utilized. The use of the term "hardenable" is not intended to limit the plastics composition to those to which a particular hardener is added, such as the epoxy type resins, but is intended to describe any plastics composition suitable for injection molding, which composition polymerizes to a product having a suitable degree of hardness or structural strength.

What I claim is:

1. A method of manufacture of a molded hub for a print wheel of the type including a precise diameter central passage and a plurality of elastically deformable, concentrically arranged radial arms capable of carrying character formations at their free ends, said method comprising the steps of:

providing a metal ring with radial passageways;

seating said ring centrally within the mold cavity for the hub;

injecting a plastics composition into the mold cavity only by way of the ring interior and through said radial passageways forming the hub and permitting said ring to become an integral part of the hub;

releasing the resultant molded article from the mold cavity together with any residual plug of plastics material within the ring; and shearing said plug cleanly from the ring leaving any remaining plastics material within the radial passageways, the inner diameter of the ring defining the inner diameter of the central passage and the said remaining material acting supplementary to maintain the ring and molded portion of the hub in permanent assembly.

2. The method as claimed in claim 1 in which said ring is circular.

3. The method as claimed in claim 1 in which the radial passageways are generally uniform in cross-section.

4. The method as claimed in claim 3 in which the area of the interior of the ring into which the plastics composition is injected is reduced to an axial length substantially equal to the cross-section of one of the radial passageways whereby to reduce the thickness of the remainent plastics material within the interior of the ring subsequent to completion of molding and prior to shearing.

5. The method as claimed in claim 1 in which the radial passageways comprise bores through the ring body.

6. The method as claimed in claim 1 in which the plastics composition is injected radially outwardly from the interior of the ring through the radial passageways thereof.

7. The hub for a print wheel formed in accordance with the method of claim 6.

* * * * *